(12) United States Patent
Tagami

(10) Patent No.: US 11,127,426 B2
(45) Date of Patent: Sep. 21, 2021

(54) MAGNETIC DISK DEVICE AND HEAD POSITION CORRECTION METHOD

(71) Applicants: Kabushiki Kaisha Toshiba, Tokyo (JP); Toshiba Electronic Devices & Storage Corporation, Tokyo (JP)

(72) Inventor: Naoki Tagami, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/922,316

(22) Filed: Jul. 7, 2020

(65) Prior Publication Data

US 2020/0335129 A1 Oct. 22, 2020

Related U.S. Application Data

(62) Division of application No. 16/266,145, filed on Feb. 4, 2019, now Pat. No. 10,741,206.

(30) Foreign Application Priority Data

Sep. 19, 2018 (JP) .............................. JP2018-174650

(51) Int. Cl.
*G11B 5/596* (2006.01)
*G11B 5/54* (2006.01)

(52) U.S. Cl.
CPC ...... *G11B 5/59627* (2013.01); *G11B 5/59655* (2013.01); *G11B 5/54* (2013.01); *G11B 5/59633* (2013.01); *G11B 5/59638* (2013.01); *G11B 5/59672* (2013.01); *G11B 5/59688* (2013.01); *G11B 5/59694* (2013.01)

(58) Field of Classification Search
None
See application file for complete search history.

(56) References Cited

U.S. PATENT DOCUMENTS

| | | | |
|---|---|---|---|
| 5,365,458 A | 11/1994 | Tamura et al. | |
| 6,369,974 B1* | 4/2002 | Asgari | G11B 5/59655 360/75 |
| 6,421,198 B1* | 7/2002 | Lamberts | G11B 5/59627 360/77.04 |
| 6,522,493 B1* | 2/2003 | Dobbek | G11B 5/59627 360/75 |
| 6,549,362 B1 | 4/2003 | Melrose et al. | |

(Continued)

FOREIGN PATENT DOCUMENTS

| | | |
|---|---|---|
| JP | 02-246064 A | 10/1990 |
| JP | 2019-117672 A | 7/2019 |
| JP | 2019-160377 A | 9/2019 |

*Primary Examiner* — Tan X Dinh
(74) *Attorney, Agent, or Firm* — White & Case LLP

(57) ABSTRACT

According to one embodiment, a magnetic disk device includes a disk including a recording region including a servo sector, a head configured to write data to the disk and read data from the disk, and a controller configured to acquire a plurality of correction data for a repeatable runout of the recording region, the correction data respectively corresponding to a plurality of measurement positions set based on a first linearity error acquired by reading the servo sector, and to correct a position of the head based on the correction data.

8 Claims, 11 Drawing Sheets

(56) References Cited

U.S. PATENT DOCUMENTS

| | | | |
|---|---|---|---|
| 6,646,824 B1 * | 11/2003 | Takaishi | G11B 5/59627 360/77.02 |
| 7,106,547 B1 | 9/2006 | Hargarten et al. | |
| 7,167,336 B1 | 1/2007 | Ehrlich et al. | |
| 7,312,946 B2 | 12/2007 | Asakura et al. | |
| 8,625,230 B2 | 1/2014 | Kosugi et al. | |
| 8,848,303 B1 | 9/2014 | Yamada | |
| 8,891,194 B1 | 11/2014 | Chu et al. | |
| 9,230,584 B1 | 1/2016 | Kosugi et al. | |
| 9,286,926 B1 | 3/2016 | Dhanda et al. | |
| 9,311,940 B1 | 4/2016 | Kharisov et al. | |
| 9,401,167 B2 | 7/2016 | Pokharel et al. | |
| 9,502,062 B1 | 11/2016 | Dorobantu et al. | |
| 9,799,360 B2 | 10/2017 | Tagami | |
| 2005/0068650 A1 | 3/2005 | Annampedu et al. | |
| 2007/0096678 A1 * | 5/2007 | Melrose | G05B 19/251 318/652 |
| 2007/0297088 A1 * | 12/2007 | Sun | G11B 5/59627 360/77.04 |
| 2008/0175113 A1 | 7/2008 | Choi | |
| 2009/0086364 A1 | 4/2009 | Gerasimov | |
| 2009/0122440 A1 * | 5/2009 | Melrose | G11B 5/59627 360/77.04 |
| 2015/0055239 A1 | 2/2015 | Hara | |
| 2015/0302876 A1 | 10/2015 | Kashiwagi et al. | |
| 2017/0263275 A1 | 9/2017 | Tagami | |
| 2019/0198050 A1 | 6/2019 | Tagami et al. | |
| 2019/0287560 A1 | 9/2019 | Tagami | |

\* cited by examiner

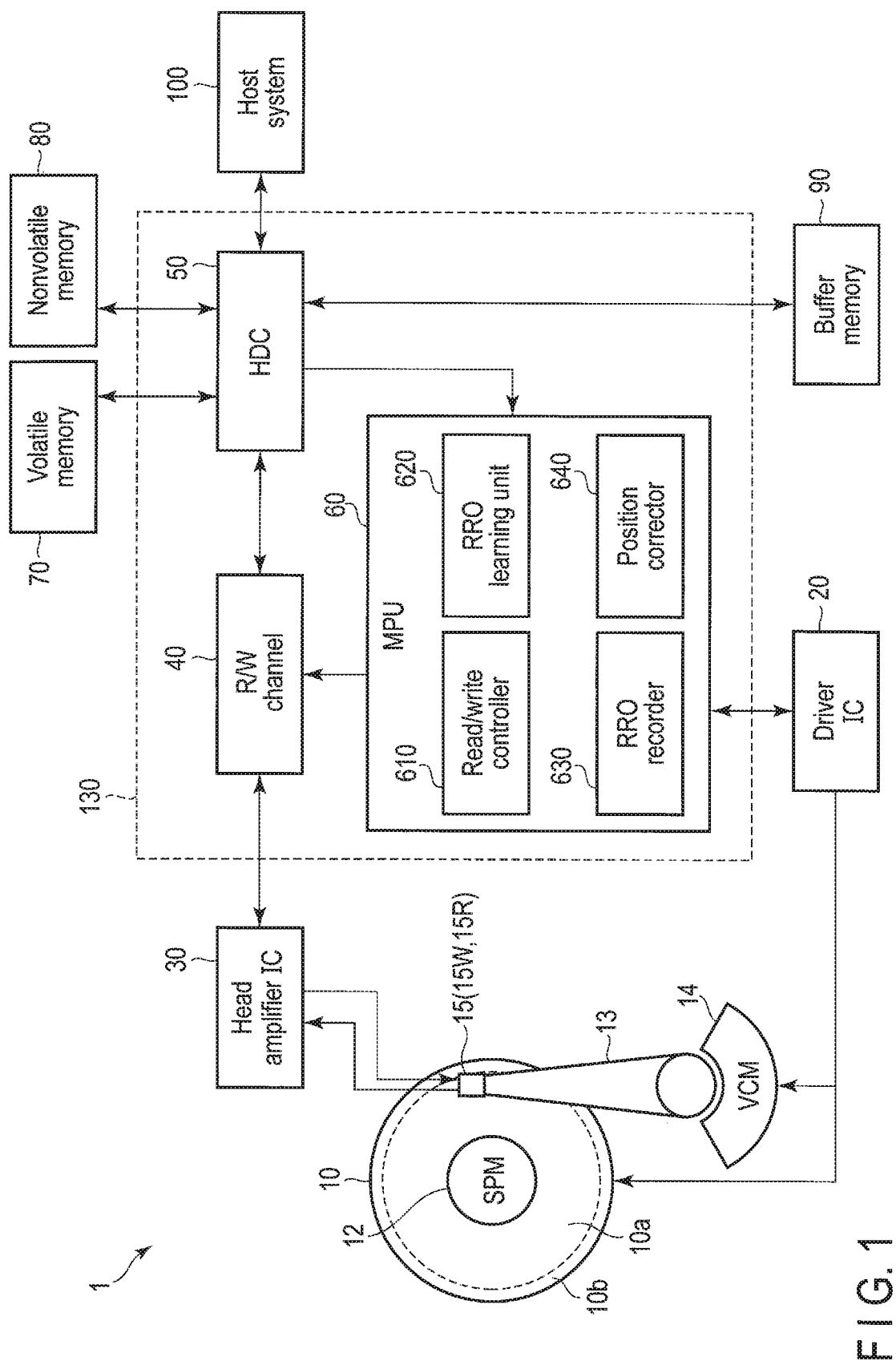
F I G. 1

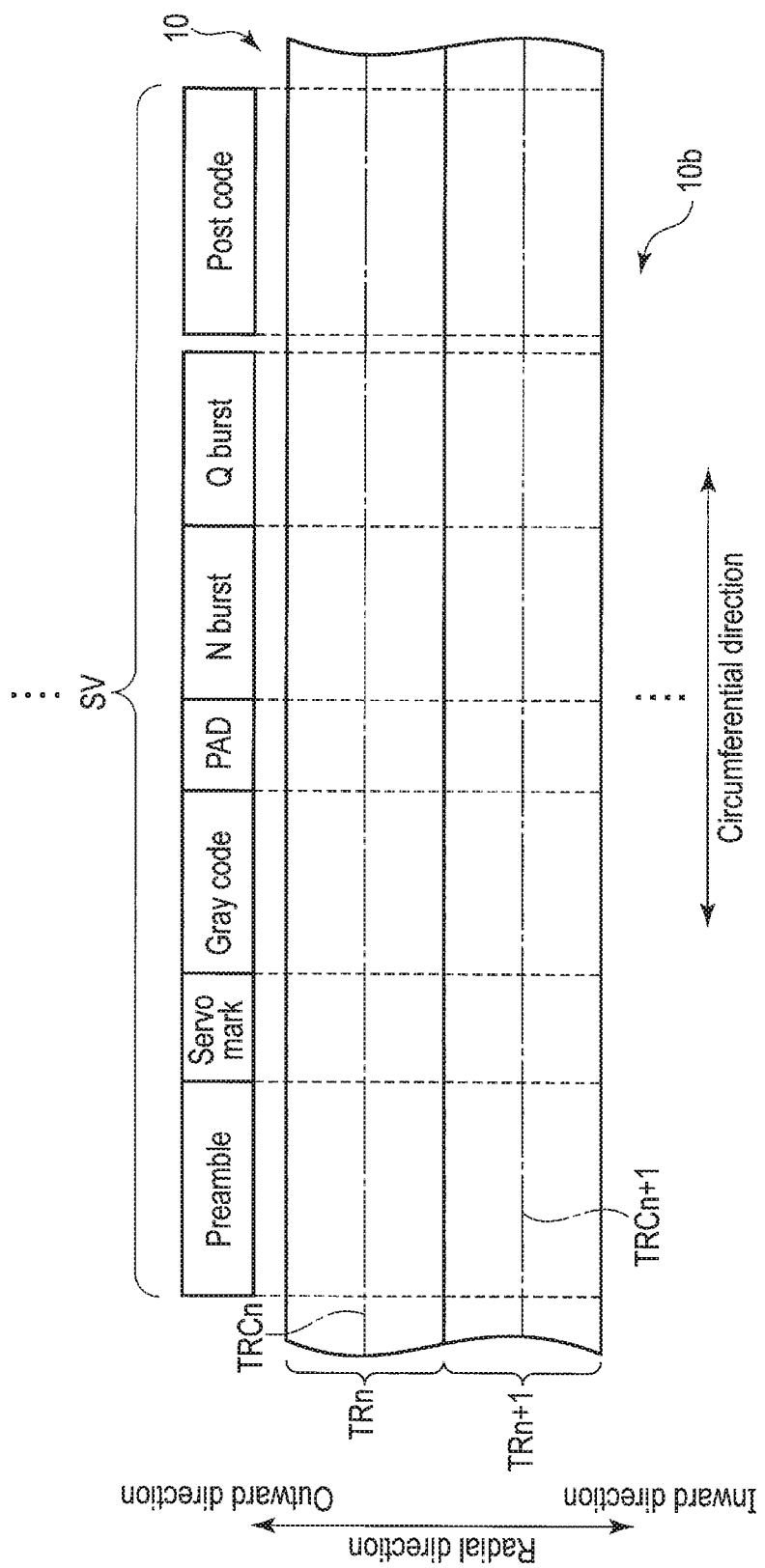
F I G. 3

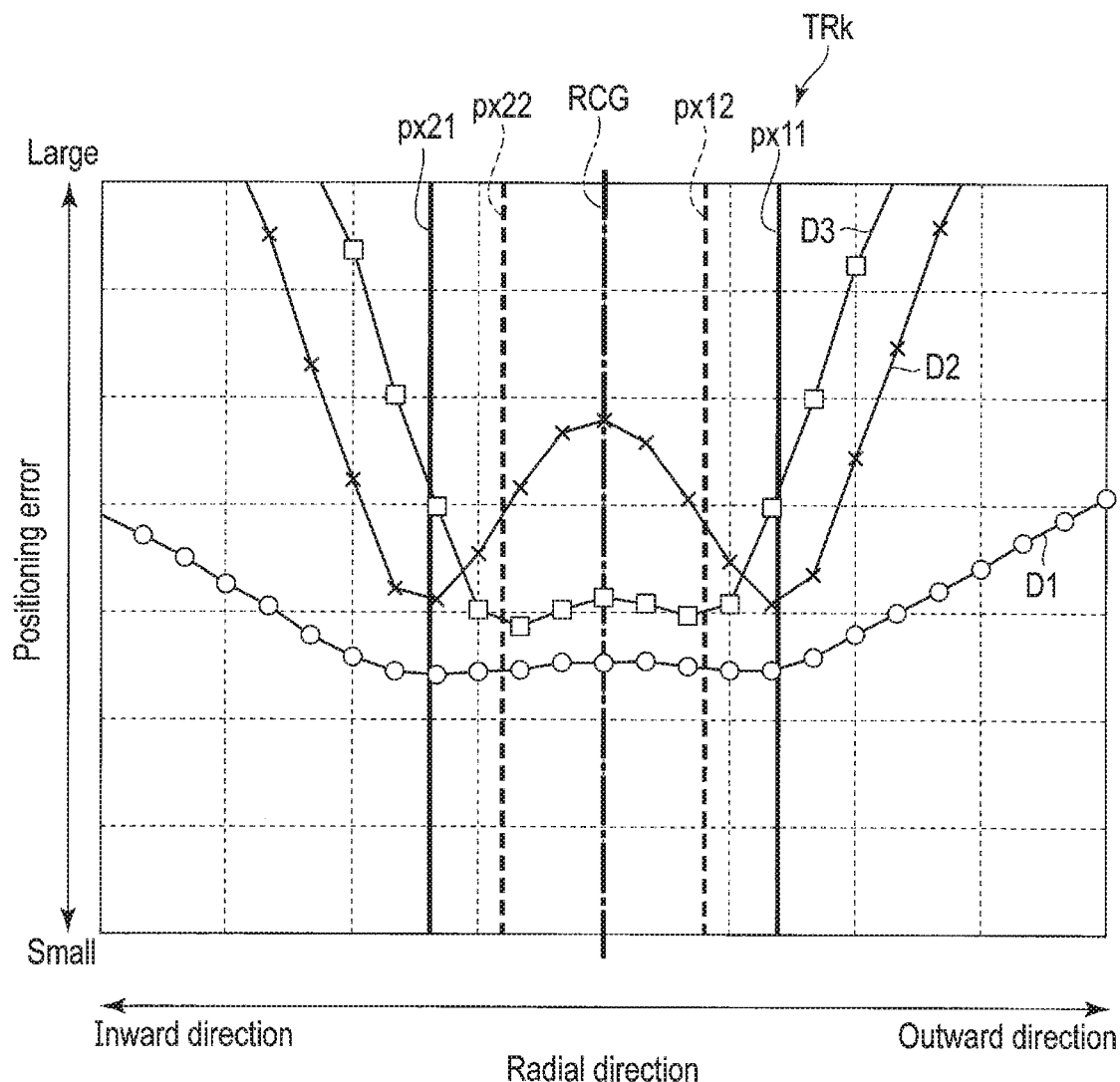
F I G. 7

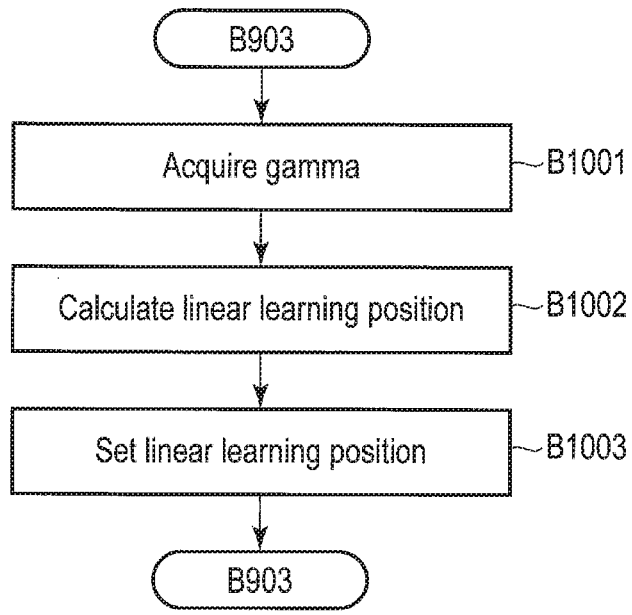
F I G. 10
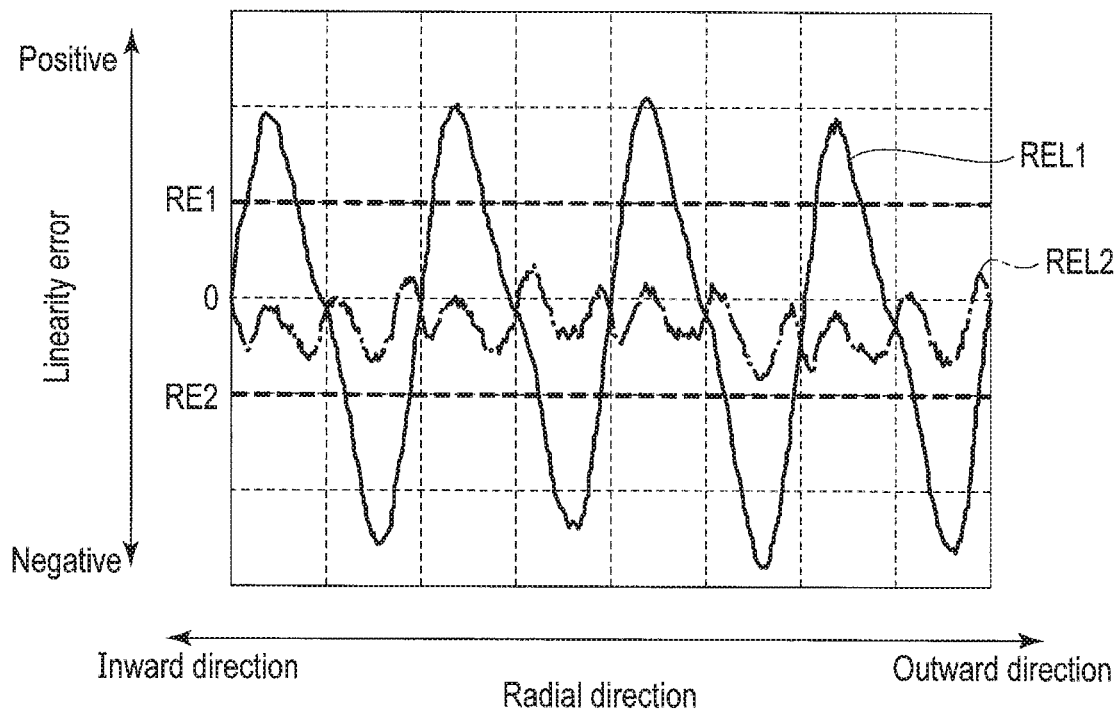
F I G. 11

MAGNETIC DISK DEVICE AND HEAD POSITION CORRECTION METHOD

CROSS-REFERENCE TO RELATED APPLICATIONS

This application is divisional application of application Ser. No. 16/266,145 filed Feb. 4, 2019 and is based upon and claims the benefit of priority from Japanese Patent Application No. 2018-174650, filed Sep. 19, 2018, the entire contents of which are incorporated herein by reference.

FIELD

Embodiments described herein relate generally to a magnetic disk device and a head position correction method.

BACKGROUND

In magnetic disk devices, a technology of suppressing an error caused by repeatable runout (RRO) (hereinafter the error is simply referred to as RRO) to correct a position of a head has been developed. For example, there is a method of measuring the RRO at a plurality of different positions in a radial direction of a disk and correcting the position of the head based on data obtained by interpolating the RRO among a plurality of measured data. In the method of correcting the position of the head, it is necessary to appropriately set the position to measure the RRO.

BRIEF DESCRIPTION OF THE DRAWINGS

FIG. 1 is a block diagram illustrating a configuration of a magnetic disk device according to a first embodiment;

FIG. 3 is a schematic diagram illustrating an example of a configuration of a servo region;

FIG. 7 is a diagram illustrating an example of distribution of positioning errors corresponding to linear learning positions and the linearity errors;

FIG. 10 is a flowchart illustrating an example of the method of setting a linear learning position according to the present embodiment;

FIG. 11 is a diagram illustrating an example of variation in the linearity error;

DETAILED DESCRIPTION

Figure 2:
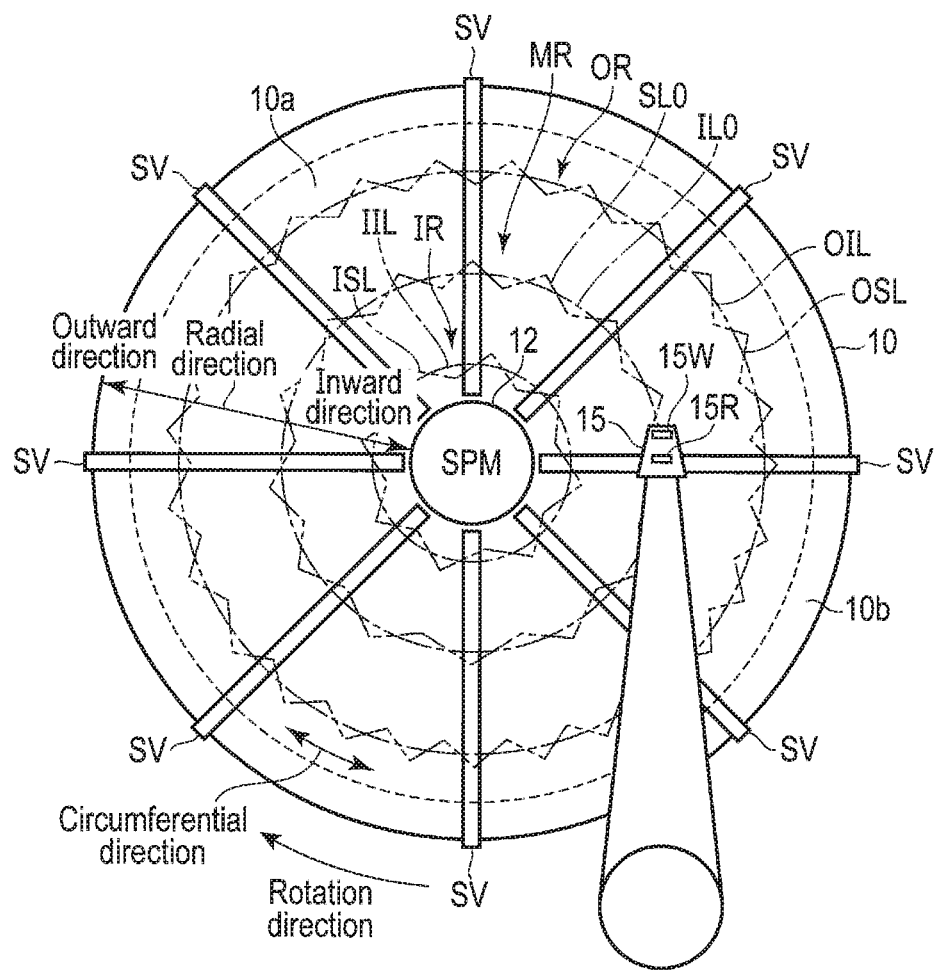
FIG. 2 is a schematic diagram illustrating an example of an arrangement of a head with respect to a disk according to the embodiment.

In general, according to one embodiment, a magnetic disk device comprises: a disk including a recording region including a servo sector; a head configured to write data to the disk and read data from the disk; and a controller configured to acquire a plurality of correction data for a repeatable runout of the recording region, the correction data respectively corresponding to a plurality of measurement positions set based on a first linearity error acquired by reading the servo sector, and to correct a position of the head based on the correction data.

According to another embodiment, a magnetic disk device comprises: a disk including a recording region including a servo sector; a head configured to write data to the disk and read data from the disk; and a controller configured to acquire a plurality of correction data for a repeatable runout of the recording region, the correction data respectively corresponding to a plurality of measurement positions set based on a Lissajous waveform acquired by reading the servo sector, and to correct a position of the head based on the correction data.

According to another embodiment, a head position correction method applied to a magnetic disk device including a disk including a recording region including a servo sector and a head configured to write data to the disk and read data from the disk, the method comprises: acquiring a plurality of correction data for a repeatable runout of the recording region, the correction data respectively corresponding to a plurality of measurement positions set based on a first linearity error acquired by reading the servo sector, and correcting a position of the head based on the correction data.

Hereinafter, embodiments will be described with reference to the drawings. Note that the drawings are merely examples and do not limit the scope of the invention.
(Embodiment)

FIG. 1 is a block diagram illustrating a configuration of a magnetic disk device 1 according to an embodiment.

The magnetic disk device 1 includes a head disk assembly (HDA), a driver IC 20, a head amplifier integrated circuit (hereinafter, head amplifier IC or preamplifier) 30, a volatile memory 70, a nonvolatile memory 80, a buffer memory (buffer) 90, and a system controller 130 that is a one-chip integrated circuit, described below. Further, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, a voice coil motor (hereinafter referred to as VCM) 14. The disk 10 is attached to the SPM 12 and rotates by driving of the SPM 12. The arm 13 and the VCM 14 constitute an actuator. The actuator controls the movement of the head 15 mounted on the arm 13 to a particular position on the disk 10 by driving of the VCM 14. Two or more numbers of the disk 10 and the head 15 may be provided.

A user data region 10$a$ usable by a user and a system area 10$b$ for writing information necessary for system management are allocated to a data writable region in the disk 10.

Hereinafter, a direction orthogonal to a radial direction of the disk 10 is referred to as a circumferential direction.

The head 15 includes a write head 15W and a read head 15R mounted on a slider as a main body. The write head 15W writes data on the disk 10. The read head 15R reads data recorded in a track on the disk 10. Note that the write head 15W may be simply referred to as a head 15, the read head 15R may be simply referred to as a head 15, and the write head 15W and the read head 15R may be collectively referred to as a head 15 in some cases. Hereinafter, a central portion of the head 15 may be referred to as a head 15, a central portion of the write head 15W may be referred to as a write head 15W, and a central portion of the read head 15R may be referred to as a read head 15R in some cases. The "track" is used as one of a plurality of regions divided in the radial direction of the disk 10, data extending in the circumferential direction of the disk 10, data written in the track, and various other meanings. A "sector" is used as one of a plurality of regions obtained by dividing the track in the circumferential direction, data written at a particular position on the disk 10, data written in the sector, and various other meanings. Further, a width in the radial direction of the track is referred to as a track width, and a center position of a target track width is referred to as a track center. The track center is, for example, a perfect circle arranged concentrically with the disk 10.

FIG. 2 is a schematic diagram illustrating an example of an arrangement of a head 15 with respect to a disk 10 according to the embodiment. In FIG. 2, a direction toward an outer periphery of the disk 10 in the radial direction is referred to as an outward direction (outer side), and a direction opposite to the outward direction is referred to as an inward direction (inner side). Further, FIG. 2 illustrates a rotation direction of the disk 10. Note that the rotation direction may be a reverse direction. In FIG. 2, the user data region 10a is divided into an inner peripheral region IR located in the inward direction, an outer peripheral region OR located in the outward direction, and a middle peripheral region MR located between the inner peripheral region IR and the outer peripheral region OR. FIG. 2 illustrates a path of a track center (hereinafter simply referred to as a track center) IIL of a particular track of the inner peripheral region IR, a track center IL0 of a particular track of the middle peripheral region MR, and a track center OIL of a particular track of the outer peripheral region OR. The track center IIL corresponds to a path to be targeted of the head 15 in a case where the head 15 is positioned at a particular track of the inner peripheral region IR (hereinafter, the path to be targeted is referred to as a target path or a target trajectory). The track center IL0 corresponds to a target path of the head 15 in a case where the head 15 is positioned at a particular track of the middle peripheral region MR. The track center OIL corresponds to a target path of the head 15 in a case where the head 15 is positioned at a particular track of the outer peripheral region OR. Further, FIG. 2 illustrates paths ISL, SL0, and OSL of the head 15 deviated from the track centers IIL, IL0, and OIL due to repeatable runout (RRO).

The disk 10 includes a plurality of servo regions SV. Hereinafter, the servo region SV may be referred to as a servo sector in some cases. The plurality of servo regions SV radially extends in the radial direction of the disk 10 and is discretely arranged with a particular interval in the circumferential direction. The servo region SV includes servo data and RRO correction data for positioning the head 15 at a particular position in the radial direction (hereinafter, the position is referred to as a radial position) of the disk 10.

The servo data includes, for example, a servo mark, address data, burst data, and the like. The address data includes an address (cylinder address) of a particular track and an address of a servo sector of a particular track. The burst data is data (relative position data) used for detecting a positional deviation (position error) in the radial direction of the head 15 with respect to the track center of a particular track, and includes a repetitive pattern of a particular period. The burst data is written in a zigzag manner across externally adjacent tracks. The burst data includes an error caused by a distortion of a track with respect to a track (track center) of a perfect circle caused by blurring (repeatable runout (RRO)) synchronized with the rotation of the disk 10 when the servo data is written to the disk. Hereinafter, for the sake of convenience of description, the error caused by the distortion of the track with respect to the track center caused by the RRO is simply referred to as RRO.

In each of the plurality of servo regions SV, a pattern constituting RRO correction data for correcting the RRO (hereinafter, the pattern is simply referred to as RRO correction data) is written. The RRO correction data is a kind of additional data of the servo data. The RRO correction data is used for correcting the RRO of the servo data (more specifically, the servo burst data in the servo data), that is, correcting the distortion of the path of the head 15 with respect to the track center. The correction of the RRO may be referred to as perfect circle correction in some cases.

The RRO correction data includes a RRO preamble pattern, a synchronization pattern, and digital data (hereinafter referred to as RRO correction code (RRO code)) obtained by encoding a correction amount. The RRO preamble pattern and the synchronization pattern are used for detecting read start timing of the digital data obtained by encoding the correction amount to be written in a subsequent region. At this time, the RRO correction code (RRO code) constitutes a main part of the RRO correction data. Such RRO correction data may be referred to as RRO bit or PostCode (post code) in some cases.

In the example illustrated in FIG. 2, in a case where the head 15 is positioned at the track center IIL of a particular track in the inner peripheral region IR, the head 15 is corrected to move from the path ISL to over the track center IIL based on the servo data of the servo region SV of the disk 10. In a case where the head 15 is positioned at the track center IL0 of a particular track in the middle peripheral region MR, the head 15 is corrected to move from the path SL0 to over the track center IL0 based on the servo data of the servo region SV of the disk 10. In a case where the head 15 is positioned at the track center OIL of a particular track in the outer peripheral region OR, the head 15 is corrected to move from the path OSL to over the track center OIL based on the servo data of the servo region SV of the disk 10.

The driver IC 20 controls driving of the SPM 12 and the VCM 14 according to control of the system controller 130 (more specifically, an MPU 60 described below).

The head amplifier IC (preamplifier) 30 includes a read amplifier and a write driver. The read amplifier amplifies a read signal read from the disk 10 and outputs the amplified read signal to the system controller 130 (more specifically, a read/write (R/W) channel 40 described below). The write driver outputs a write current corresponding to a signal output from the R/W channel 40 to the head 15.

The volatile memory 70 is a semiconductor memory in which stored data is lost when a power supply is cut off. The volatile memory 70 stores data and the like necessary for processing in each part of the magnetic disk device 1. The volatile memory 70 is, for example, a dynamic random access memory (DRAM) or a synchronous dynamic random access memory (SDRAM).

The nonvolatile memory 80 is a semiconductor memory in which stored data is recorded even when the power supply is cut off. The nonvolatile memory 80 is, for example, a NOR-type or NAND-type flash read only memory (flash ROM: FROM).

The buffer memory 90 is a semiconductor memory that temporarily records data and the like transmitted and received between the magnetic disk device 1 and the host 100. Note that the buffer memory 90 may be integrally configured with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is realized by using a large scale integrated circuit (LSI) called system-on-a-chip (SoC) in which a plurality of elements is integrated on a single chip, for example. The system controller 130 includes the read/write (R/W) channel 40, a hard disk controller (HDC) 50, and a microprocessor (MPU) 60. The system controller 130 is electrically connected to, for example, the driver IC 20, the head amplifier IC 30, the volatile memory 70, the nonvolatile memory 80, the buffer memory 90, and the host 100.

The R/W channel 40 executes signal processing of read data transferred from the disk 10 to the host 100 and write data transferred from the host 100 in response to an instruction from the MPU 60 described below. The R/W channel 40 has a circuit or a function to measure signal quality of the read data. The R/W channel 40 is electrically connected to, for example, the head amplifier IC 30, the HDC 50, the MPU 60, and the like.

The HDC 50 controls data transfer between the host 100 and the R/W channel 40 in response to an instruction from the MPU 60 to be described below. The HDC 50 is electrically connected to, for example, the R/W channel 40, the MPU 60, the volatile memory 70, the nonvolatile memory 80, the buffer memory 90, and the like.

The MPU 60 is a main controller that controls each part of the magnetic disk device 1. The MPU 60 controls the VCM 14 via the driver IC 20 and executes servo control for positioning the head 15. In addition, the MPU 60 controls the SPM 12 via the driver IC 20 to rotate the disk 10. The MPU 60 controls a write operation of data to the disk 10 and selects a save destination of the write data. Further, the MPU 60 controls a read operation of data from the disk 10 and controls processing of the read data. The MPU 60 is connected to each part of the magnetic disk device 1. The MPU 60 is electrically connected to, for example, the driver IC 20, the R/W channel 40, the HDC 50, and the like.

The MPU 60 includes a read/write controller 610, an RRO learning unit 620, an RRO recorder 630, and a position corrector 640. The MPU 60 executes processing of these units, for example, the read/write controller 610, the RRO learning unit 620, the RRO recorder 630, the position corrector 640, and the like on firmware. Note that the MPU 60 may include these units, for example, the read/write controller 610, the RRO learning unit 620, the RRO recorder 630, and the position corrector 640, as circuits.

The read/write controller 610 controls data read processing and data write processing according to a command from the host 100. The read/write controller 610 controls the VCM 14 via the driver IC 20, positions the head 15 at a particular position on the disk 10, and reads or writes data.

Hereinafter, "positioning or arranging the head 15 (the write head 15W and the read head 15 R) at a particular position on the disk 10, for example, at a position to be targeted (hereinafter referred to as a target position) of a particular track" may be described as "positioning or arranging the head 15 (the write head 15W and the read head 15R) at a particular track" in some cases.

The RRO learning unit 620 positions the read head 15R at a particular position on the disk 10, for example, at the track center of a particular track, measures a difference value (hereinafter referred to as an RRO correction amount) between the track center and the position of the head 15 (read head 15R) demodulated from the read servo data, and calculates RRO correction data from a measurement result. Hereinafter, "measuring the RRO correction amount" and "calculating the RRO correction data based on the RRO correction amount" are referred to as "RRO learning". The "RRO learning" may be simply referred to as "measuring", "reading", "acquiring", or the like. In some cases, the RRO correction amount and the RRO correction data may be used in the same meaning. A particular radial position at which the RRO learning is executed and a particular radial position at which the RRO learning has been executed may be referred to as a learning position in some cases. For example, the learning position corresponds to a distance in the radial direction from the track center of a particular track. Further, the RRO learning unit 620 can acquire RRO learned position information in the circumferential direction RRO, and the like. For example, the RRO learning unit 620 executes RRO learning processing at a test stage or a product stage of the magnetic disk device 1. Note that the RRO learning unit 620 may execute the RRO learning at some positions in the circumferential direction at a particular radial position or may execute the RRO learning at all positions in the circumferential direction. Further, the RRO learning unit 620 may execute the RRO learning at several radial positions or may execute the RRO learning at all radial positions on the disk 10.

The RRO learning unit 620 estimates change in the radial direction of the RRO correction amount of the disk 10 (hereinafter, the change is referred to as change of the RRO or change of the RRO correction amount) in a particular region in the radial direction of the disk 10 (hereinafter, the particular region is referred to as radial region) based on a plurality of the RRO correction amounts respectively corresponding to a plurality of the learning positions, and executes the RRO learning at a plurality of the radial positions of the radial region of the disk 10 in order to correct the radial position of the head 15 based on the estimated change of the RRO correction amount of the radial region. Hereinafter, the radial position of the head 15 may be simply referred to as a head position. For example, a slope of the change of the RRO may vary from track to track. The RRO learning unit 620 executes the RRO learning at a plurality of radial positions of the radial region of the disk 10, where processing of estimating change of the RRO correction amount of the region based on two RRO correction amounts respectively acquired at two learning positions, and correcting the radial position of the head 15 based on the estimated change of the RRO correction amount is executable. Hereinafter, the "processing of estimating change of the RRO correction amount of the region based on two RRO correction amounts respectively acquired at two learning positions in the radial region, and correcting the head position based on the estimated change of the RRO correction amount" may be referred to as "linear RRO correction processing" in some cases. Note that, in the linear RRO correction processing, the change of the RRO correction amount of the region may be estimated based on three or more RRO correction amounts respectively acquired at three learning positions in the radial region, and the head position may be corrected based on the estimated change of the RRO correction amounts.

The RRO learning unit 620 sets the learning position (hereinafter referred to as linear learning position) used in the linear RRO correction processing based on a difference value between information corresponding to an arrangement in the radial direction of an ideal radial region (or a particular track), for example, of two adjacent tracks (the information may be referred to as ideal servo demodulation criterion), and information corresponding to an arrangement in the radial direction of the particular track acquired by measurement (the information may be referred to as actual servo demodulation criterion) in order to improve the accuracy of the linear RRO correction processing. The arrangement in the radial direction of the radial region (or a particular track) includes, for example, a distortion in the radial direction of the radial region (or the particular track) with respect to the track center (hereinafter, the distortion may be referred to as nonlinearity of the servo demodulation criterion). Hereinafter, the difference value between the information corresponding to the arrangement in the radial direction of the ideal radial region and the information corresponding to the arrangement in the radial direction of the radial region acquired by measurement is referred to as a linearity error. For example, the linearity error is an index indicating a distortion of the radial region, for example, the particular track.

The RRO learning unit 620 includes a function to correct the linearity error in a process of reading a signal of the servo region SV and calculating a servo demodulation position. Hereinafter, "correcting the linearity error" is referred to as "linearity correction". The RRO learning unit 620 adjusts various parameters (hereinafter referred to as correction parameters) corresponding to the linearity correction in the process of calculating the servo demodulation position and executes the linearity correction. The RRO learning unit 620 may record the correction parameters adjusted when executing the linearity correction in a particular recording region, for example, the disk 10 and the nonvolatile memory 80. The RRO learning unit 620 executes the linearity correction, for example, in a manufacturing process. For example, in a case where the linearity correction is not appropriate in the manufacturing process, the linearity error may become large. The RRO learning unit 620 sets, for example, the linear learning position based on the correction parameters.

Hereinafter, the linearity error will be described with reference to FIGS. 3 to 6.

FIG. 3 is a schematic diagram illustrating an example of a configuration of the servo region SV. FIG. 3 illustrates a track TRn and a track TRn+1 that are arranged in succession in the radial direction. The track TRn has a track center TRCn. The track TRn+1 has a track center TRCn+1. Note that, for convenience of description, the tracks TRn and TRn+1 linearly extend in the circumferential direction, but in practice the tracks TRn and TRn+1 are curved along the circumferential direction of the disk 10. Each of the tracks TRn and TRn+1 may extend in the circumferential direction in a wavy manner while periodically varying. In addition, the tracks TRn and TRn+1 may be slightly spaced apart in the radial direction or may be partially overlapped.

In the example illustrated in FIG. 3, the servo region SV includes preamble, servo mark, gray code, PAD, N burst, Q burst, and post code. The preamble includes preamble information for being synchronized with a reproduction signal of a servo pattern. The servo mark includes servo mark information indicating the start of the servo pattern. The gray code includes gray code information indicating a servo sector number, a track (cylinder) number, and the like. The PAD includes PAD information of synchronization signals of gap and servo AGC. The N burst and the Q burst include burst information indicating a relative position in the radial direction of the head 15 (the write head 15W and the read head 15R) with respect to the track. The post code includes the RRO correction data. Note that the post code need not be included in the servo region SV.

In the example illustrated in FIG. 3, the RRO learning unit 620 demodulates the gray code, the N burst, the Q burst, and the PostCode following the servo mark information in the circumferential direction, the servo mark information having been read by the read head 15R at the radial position of the servo mark, for example, at the track center TRCn of the track TRn, and detects the demodulated radial position of the read head 15R as the servo demodulation position. The RRO learning unit 620 may record information of the detected servo demodulation position and the like in a particular recording region, for example, the disk 10 and the nonvolatile memory 80.

Figure 4:
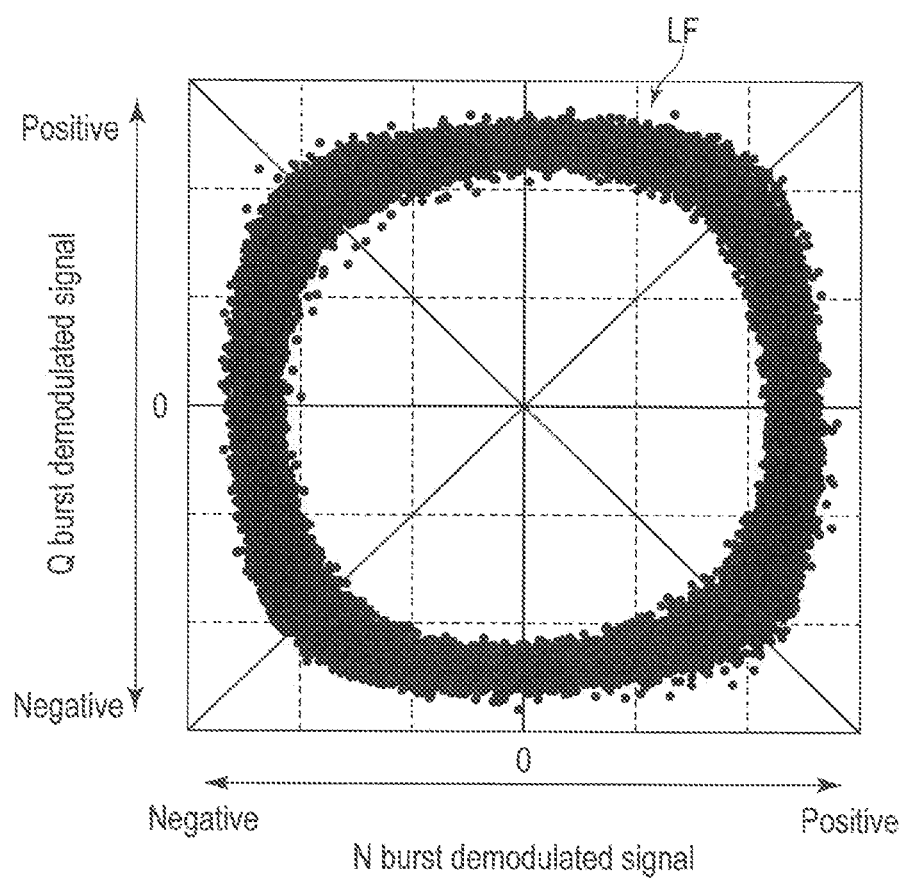
FIG. 4 is a diagram illustrating an example of a Lissajous waveform of a demodulated signal obtained by demodulating N burst and a demodulated signal obtained by demodulating Q burst.

FIG. 4 is a diagram illustrating an example of a Lissajous waveform of a demodulated signal obtained by demodulating the N burst and a demodulated signal obtained by demodulating the Q burst. In FIG. 4, the horizontal axis represents the demodulated signal obtained by demodulating an N burst signal read by the read head 15 R at a particular radial position (hereinafter, the demodulated signal is referred to as an N burst demodulated signal), and the vertical axis represents a demodulated signal obtained by demodulating a Q burst signal read by the read head 15R at a particular radial position (hereinafter referred to as a Q burst demodulated signal). The N burst demodulated signal corresponds to, for example, a demodulation position at which the N burst is demodulated, and corresponds to an amount of deviation in the radial direction from the track center (or the target position) of the track corresponding to the demodulated N burst (hereinafter, the amount of deviation is referred to as an off-track amount). The Q burst signal corresponds to, for example, a demodulation position at which the Q burst is demodulated, and corresponds to the off-track amount from the track center (or the target position) of the track corresponding to the demodulated Q burst. On the horizontal axis in FIG. 4, the demodulated signal becomes larger in the direction of positive values as the axis goes in the direction of the positive arrow from the origin 0, and the demodulated signal becomes smaller in the direction of negative values as the axis goes in the direction of the negative arrow from the origin 0. On the vertical axis in FIG. 4, the demodulated signal becomes larger in the direction of positive values as the axis goes in the direction of the positive arrow from the origin 0, and the demodulated signal becomes smaller in the direction of negative values as the axis goes in the direction of the negative arrow from the origin 0. FIG. 4 illustrates a Lissajous waveform (or Lissajous figure) LF. One round of the Lissajous waveform LF corresponds to information corresponding to the radial positions in the radial region corresponding to two servo tracks, and for example, corresponds to information corresponding to the radial positions in the radial region of the tracks TRn and TRn+1 illustrated in FIG. 3.

In the example illustrated in FIG. 4, the Lissajous waveform LF has a substantially circular shape. In a case where the Lissajous waveform LF has a circular shape, the linearity error can be small. In a case where the Lissajous waveform LF has a rectangular shape, the linearity error can be large. The RRO learning unit 620 may acquire the Lissajous waveform LF based on the demodulated signals obtained by demodulating data read at the radial positions in the radial region of at least two servo tracks. Further, the RRO learning unit 620 may record the acquired Lissajous waveform LF in a particular recording region, for example, the disk 10 and the nonvolatile memory 80.

Figure 5:
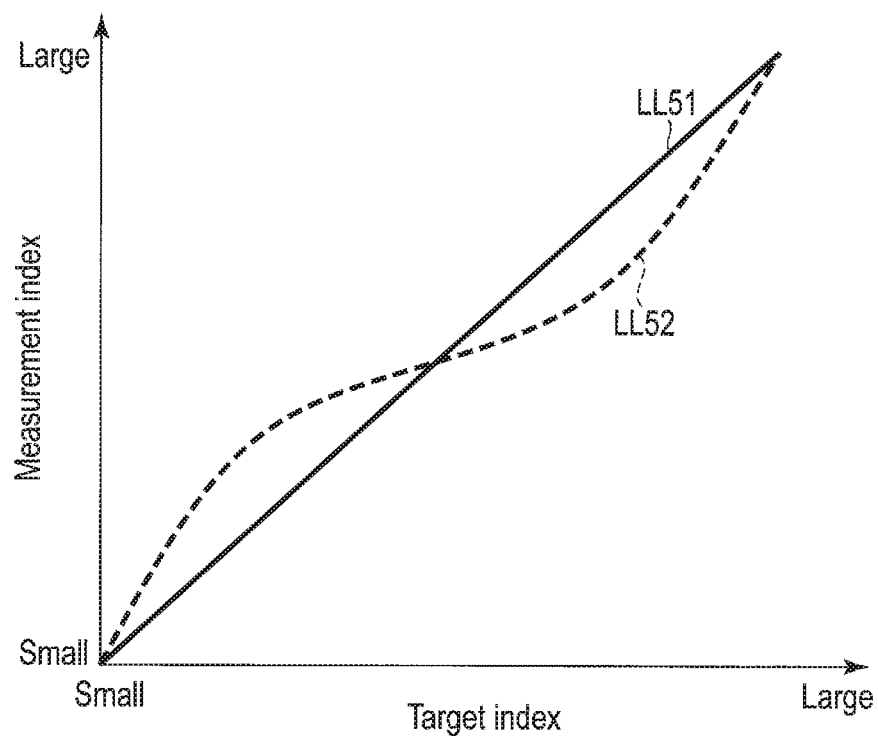
FIG. 5 is a diagram illustrating an example of a relationship between a target index and a measurement index of a servo demodulation criterion.

FIG. 5 is a diagram illustrating an example of a relationship between a target index and a measurement index of the servo demodulation criterion. In FIG. 5, the horizontal axis represents a servo off-track amount to be targeted in the radial region (hereinafter referred to as a target index), and the vertical axis represents an actual servo off-track amount based on the Q burst demodulated signal and the N burst demodulated signal obtained by measurement in the radial region (hereinafter, the actual servo off-track amount is referred to as measurement index). On the horizontal axis, the target index becomes larger as the axis goes along the arrow of large, and the target index becomes smaller as the axis goes along the arrow of small. On the vertical axis, the target index becomes larger as the axis goes along the arrow of large, and the target index becomes smaller as the axis goes along the arrow of small. FIG. 5 illustrates a line LL51 and a broken line LL52. The line LL51 and the broken line LL52 indicate a relationship between the target index and the measurement index.

In the example illustrated in FIG. 5, the line LL51 indicates that the measurement index and the target index are in a proportional relationship. That is, the line LL51 indicates that no linearity error has occurred. The broken line LL52 indicates that the measurement index and the target index are in a nonlinear relationship. That is, the broken line LL52 indicates that the linearity error has occurred. The RRO learning unit 620 calculates, for example, the measurement index based on the Q burst demodulated signal and the N burst demodulated signal and calculates the relationships LL51 and LL52 between the target index and the measurement index based on the calculated measurement index and the target index.

Figure 6:
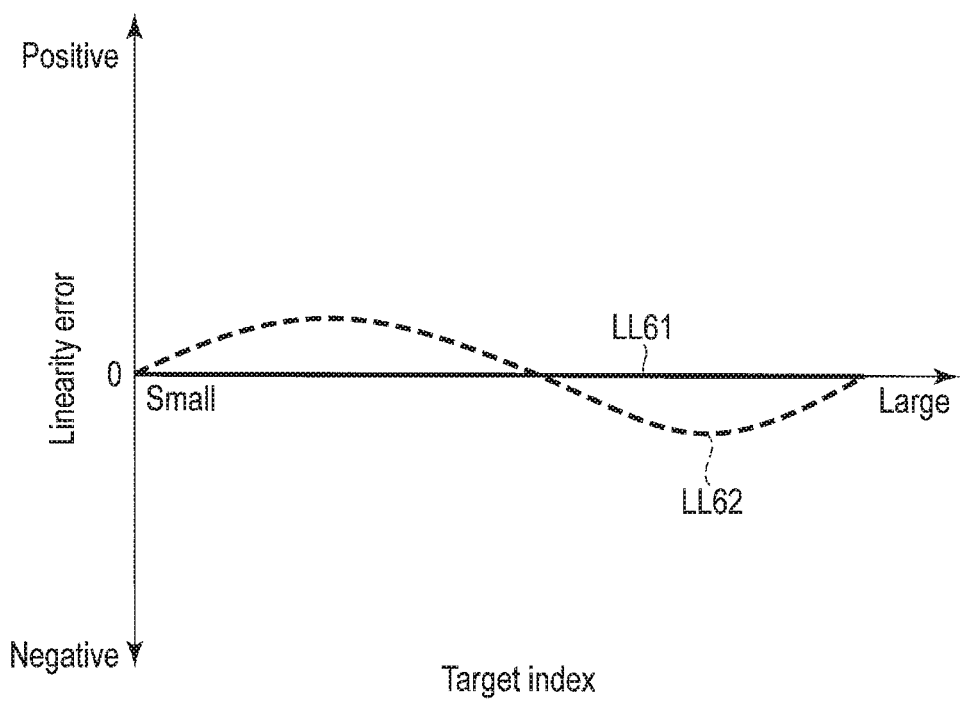
FIG. 6 is a schematic diagram illustrating an example of a linearity error.

FIG. 6 is a schematic diagram illustrating an example of the linearity error. In FIG. 6, the horizontal axis represents the target index and the vertical axis represents the linearity error. On the horizontal axis, the target index becomes larger as the axis goes along the arrow of large, and the target index becomes smaller as the axis goes along the arrow of small. On the vertical axis, the linearity error becomes larger in the direction of positive values as the axis goes along the positive arrow from the origin 0, and the linearity error becomes smaller in the direction of negative values as the axis goes along the negative arrow from the origin 0. FIG. 6 illustrates a line LL61 and a broken line LL62. The line LL61 and the broken line LL62 indicate a relationship between the target index and the linearity error. The line LL61 corresponds to the line LL51 illustrated in FIG. 5, and the broken line LL62 corresponds to the broken line LL52 illustrated in FIG. 5.

In the example illustrated in FIG. 6, in a case where the linearity error occurs as indicated by the relationship LL62 between the target index and the linearity error, the RRO learning unit 620 executes the linearity correction. The RRO learning unit 620 adjusts various correction parameters to adjust the linearity error. The RRO learning unit 620 records the various correction parameters in a particular recording region, for example, the disk 10 and the nonvolatile memory 80.

FIG. 7 is a diagram illustrating an example of distribution of positioning errors corresponding to the linear learning positions and the linearity errors. In FIG. 7, the horizontal axis represents the radial position of a track TRk with respect to a track center RCG, and the vertical axis represents a servo positioning error (repeatable position error (RPE)) of a case of positioning the head 15 at a particular radial position of the track TRk based on the RRO correction amount acquired by the linear RRO correction processing at the track TRk. On the horizontal axis, the radial position is located on the outer periphery side of the disk 10 as the axis goes along the arrow of the outward direction, and the radial position is located on the inner periphery side of the disk 10 as the axis goes along the arrow of the inward direction. On the vertical axis, the positioning error becomes larger as the axis goes along the arrow of large, and the positioning error becomes smaller as the axis goes along the arrow of small. FIG. 7 illustrates the track center RCG of the track TRk, a linear learning position px11 located in the outward direction from the track center RCG, a linear learning position px21 located in the inward direction from the track center RCG, a linear learning position px12 located in the outward direction from the track center RCG and in the inward direction from the linear learning position px11, and a linear learning position px22 located in the inward direction from the track center RCG and in the outward direction from the linear learning position px21. FIG. 7 illustrates distribution D1 of the positioning errors, distribution D2 of the positioning errors, and distribution D3 of the positioning errors.

In the example illustrated in FIG. 7, the distribution D1 of the positioning errors illustrates change of the positioning error in a case of positioning the head 15 at the radial positions of the track TRk based on the RRO correction amounts corresponding to the radial positions of the track TRk acquired by the linear RRO correction processing using the two RRO correction amounts respectively learned at the linear learning positions px11 and px21 in a case where the linearity error is small. In the distribution D1 of the positioning errors, each round point indicates a measured value of each positioning error measured by positioning the head 15 at each radial position in the track TRk. In FIG. 7, the distribution D2 of the positioning errors illustrates change of the positioning error in a case of positioning the head 15 at the radial positions of the track TRk based on the RRO correction amounts corresponding to the radial positions of the track TRk acquired by the linear RRO correction processing using the two RRO correction amounts respectively learned at the linear learning positions px11 and px21 in a case where the linearity error is large. In the distribution D2 of the positioning errors, each cross point indicates a measured value of each positioning error measured by positioning the head 15 at each radial position in the track TRk. In FIG. 7, the distribution D3 of the positioning errors illustrates change of the positioning error in a case of positioning the head 15 at the radial positions of the track TRk based on the RRO correction amounts corresponding to the radial positions of the track TRk acquired by the linear RRO correction processing using the two RRO correction amounts respectively learned at the linear learning positions px12 and px22 in a case where the linearity error is large. In the distribution D3 of the positioning errors, each square point indicates a measured value of each positioning error measured by positioning the head 15 at each radial position in the track TRk.

In the example illustrated in FIG. 7, in the case where the linearity error is large, the positioning errors are smaller in the linear learning positions px12 and px22 than in the linear learning positions px11 and px21. In other words, in the case where the linearity error is large, the positioning error becomes smaller as an interval between two linear learning positions (hereinafter referred to as linear learning position interval) is smaller. That is, in a case where the linearity error is large, the cycle of the variation of RRO is short and the variation of RRO is large. As illustrated in FIG. 7, the linearity error corresponds to RRO (RRO correction amount). For example, in a case of executing the linear RRO correction processing, the RRO learning unit 620 makes the linear learning position interval smaller as the linearity error becomes larger. In other words, in the case of executing the linear RRO correction processing, the RRO learning unit 620 makes the linear learning position interval larger as the linearity error becomes smaller. Further, for example, in the case of executing the linear RRO correction processing, the RRO learning unit 620 can maximize the linear learning position interval when the linearity error is zero.

Figure 8:
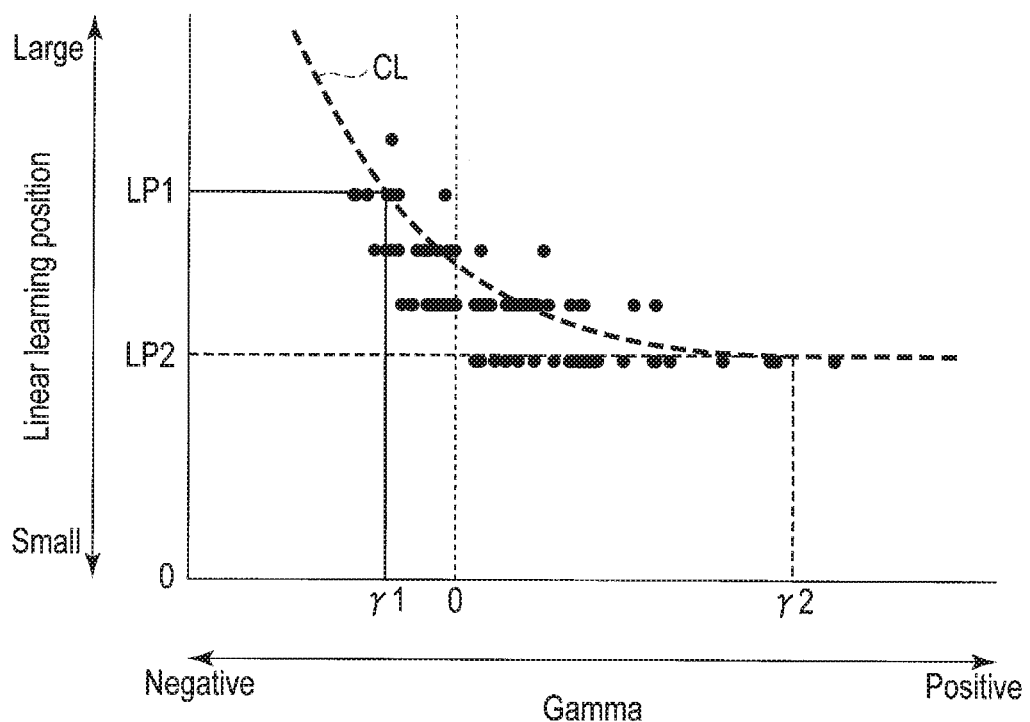
FIG. 8 is a diagram illustrating an example of a method of setting a linear learning position according to the present embodiment.

FIG. 8 is a diagram illustrating an example of a method of setting a linear learning position according to the present embodiment. In FIG. 8, the horizontal axis represents gamma ($\gamma$) corresponding to the correction parameter corresponding to a particular track, and the vertical axis represents the linear learning position corresponding to the distance in the radial direction from the track center of the particular track. The linear learning position is, for example, on the order of nanometers [nm]. On the horizontal axis, the gamma becomes larger in the direction of positive values as the axis goes along the positive arrow from the origin 0, and the gamma becomes smaller in the direction of negative values as the axis goes along the negative arrow from the origin 0. On the vertical axis, the linear learning position becomes larger as the axis goes along the arrow of large, and the linear learning position becomes smaller as the axis goes along the arrow of small. In FIG. 8, each of a plurality of round points indicates the linear learning position measured with particular gamma. Hereinafter, the learning position measured with the particular gamma is referred to as a measurement point. FIG. 8 illustrates a correlation expression CL between the gamma and an optimum linear learning position, which is derived from a plurality of the measurement points. FIG. 8 illustrates a radial position LP1 corresponding to gamma $\gamma 1$ in the correlation expression CL and a radial position LP2 corresponding to gamma $\gamma 2$ in the correlation expression CL. The gamma $\gamma 2$ is larger than the gamma $\gamma 1$. The radial position LP2 is smaller than the radial position LP1. The gamma is acquired at the time of executing the linearity correction, and changes according to the result of the linearity correction. The gamma indicates whether the linearity error of the radial region is large or small. The linearity error of the radial region becomes larger as the gamma becomes larger, and the linearity error of the radial region becomes smaller as the gamma becomes smaller. The Lissajous waveform in the radial region approaches a quadrilateral shape as the gamma becomes larger, and the Lissajous waveform in the radial region approaches a round shape as the gamma becomes smaller. A ratio of maximum amplitude to minimum amplitude of the Lissajous waveform in the radial region becomes larger than 1 as the gamma becomes larger, and the maximum amplitude with respect to the minimum amplitude of the Lissajous waveform in the radial region approaches 1 as the gamma becomes smaller.

The RRO learning unit 620 sets the linear learning position based on the gamma acquired in the linearity correction of the radial region and the correlation expression CL. The RRO learning unit 620 may derive, in advance, a plurality of the correlation expressions CL adjusted for each magnetic disk and each head from a plurality of the measurement points measured in each magnetic disk device or each head, and record the plurality of correlation expressions CL in a particular recording region, for example, the disk 10 and the nonvolatile memory 80. In a case of setting the linear learning position, the RRO learning unit 620 selects an appropriate correlation expression for a particular magnetic disk device or a particular head. In the example illustrated in FIG. 8, in a case of acquiring the gamma $\gamma 1$, the RRO learning unit 620 sets an absolute value of the linear learning position in the outward direction from the track center of a particular track to the radial position LP1, and sets an absolute value of the linear learning position in the inward direction from the track center to the radial position LP1, based on the gamma $\gamma 1$ and the correlation expression CL. In a case of acquiring the gamma $\gamma 2$, the RRO learning unit 620 sets an absolute value of the linear learning position in the outward direction from the track center of a particular track to the radial position LP2, and sets an absolute value of the linear learning position in the inward direction from the track center to the radial position LP2, based on the gamma $\gamma 2$ and the correlation expression CL. Note that the RRO learning unit 620 may set the linear learning position based on the Lissajous waveform. For example, the RRO learning unit 620 makes the linear learning position from the track center of a particular track larger as the Lissajous waveform approaches a round shape, and makes the linear learning position from the track center of the particular track smaller as the Lissajous waveform approaches a quadrilateral shape.

The RRO recorder 630 positions the head 15 at a particular radial position and writes the RRO correction data acquired by the RRO learning in the particular servo region SV. The RRO recorder 630 writes at least one RRO correction data in each servo region SV. The RRO recorder 630 can adjust a readable radial width (hereinafter referred to as reproduction width) of the RRO correction data. The RRO recorder 630 can increase or decrease the reproduction width according to an arrangement interval of the RRO correction data and a write condition (for example, write current or write flying height), for example. In addition, the reproduction width can also be increased or decreased according to design conditions such as the width of the write head 15W and the width of the read head 15R. The RRO recorder 630 writes the RRO correction data such that the center position of the reproduction width of the RRO correction data (hereinafter simply referred to as RRO correction data) is arranged within a particular range set in the radial direction from the track center, in which write of data is allowed in each track (hereinafter, the particular range is referred to as allowed range).

The position corrector 640 reads the RRO correction data (RRO bit) corresponding to a particular region in the circumferential direction of a particular track (the particular region is referred to as circumferential region), and corrects the head position to approach a particular radial position in the circumferential region, for example, the track center based on the RRO correction amount acquired from the read RRO correction data, the learning position obtained by learning the RRO correction data, and the off-track amount from the track center of the circumferential region corresponding to the RRO correction data to the head position in the circumferential region corresponding to the RRO correction data. The position corrector 640 executes the linear RRO correction processing of calculating change of the RRO correction amount of the radial region based on at least two RRO correction amounts respectively learned at least two linear learning positions, and correcting the head position in the radial region based on the calculated change of the RRO correction amount of the radial region.

Figure 9:
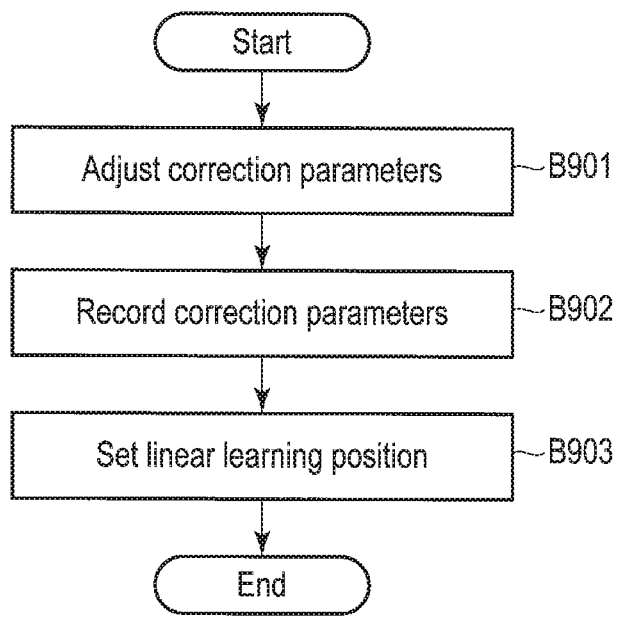
FIG. 9 is a flowchart illustrating an example of a method of determining a learning position in linear RRO correction processing according to the present embodiment.

FIG. 9 is a flowchart illustrating an example of a method of determining the learning position in the linear RRO correction processing according to the present embodiment.

The MPU 60 adjusts the correction parameters in the linearity correction executed when demodulating the signal read in the servo region SV (B901). The MPU 60 records correction parameters in a particular recording region, for example, the disk 10 and the nonvolatile memory 80 (B902). The MPU 60 sets the linear learning position based on the correction parameters (B903), writes the RRO correction data learned at the set linear learning position, and terminates the processing.

FIG. 10 is a flowchart illustrating an example of the method of setting the linear learning position according to the present embodiment.

In the processing of B903 in FIG. 9, the MPU 60 acquires the gamma of the correction parameters (B1001). The MPU 60 calculates the linear learning position based on the gamma and the correlation expression CL (B1002). The MPU 60 sets the calculated linear learning position (B1003) and proceeds to the processing of B903.

According to the present embodiment, the magnetic disk device 1 adjusts the correction parameters in the linearity correction executed when demodulating the signal read in the servo region SV, and sets the linear learning position based on the gamma in the correction parameters and the correlation expression CL. Therefore, the magnetic disk device 1 can improve the accuracy of the linear RRO correction processing. Therefore, the magnetic disk device 1 can improve the servo positioning accuracy.

Next, magnetic disk devices according to modifications and another embodiment will be described. In the modifications and another embodiment, the same reference numerals are given to the same parts as those in the above embodiment, and a detailed description thereof will be omitted.

(First Modification)

A magnetic disk device 1 of a first modification is different from the above-described embodiment in a method of setting a linear learning position.

After executing linearity correction in a radial region, an RRO learning unit 620 measures variation in a linearity error in the radial region where the linearity correction has been executed, for example, in two tracks adjacent in a radial direction, and sets an RRO learning position based on the measured variation in the linearity error.

FIG. 11 is a diagram illustrating an example of variation in the linearity error. In FIG. 11, the horizontal axis represents the radial direction and the vertical axis represents the linearity error of the radial region. On the horizontal axis, a radial position is located on an outer periphery side of a disk 10 as the axis goes along the arrow of an outward direction, and the radial position is located on an inner periphery side of the disk 10 as the axis goes along the arrow of an inward direction. On the vertical axis, the linearity error becomes larger in the direction of positive values as the axis goes along the positive arrow from the origin 0, and the linearity error becomes smaller in the direction of negative values as the axis goes along the negative arrow from the origin 0. FIG. 11 illustrates, for example, variation in the linearity error in the radial region of two servo tracks as illustrated in FIG. 3. FIG. 11 illustrates variation REL1 of the linearity error in the radial region and variation REL2 of the linearity error smaller than the variation REL1 of the linearity error in the radial region. FIG. 11 illustrates threshold values RE1 and RE2 for setting the linear learning position. For example, absolute values of the threshold values RE1 and RE2 are the same. Note that the absolute values of the threshold values RE1 and RE2 may not be the same. For example, the example illustrated in FIG. 11 may corresponds to the example illustrated in FIG. 7.

In the example illustrated in FIG. 11, after executing the linearity correction in the radial region, the RRO learning unit 620 measures the variation REL1 in the linearity error in the radial region where the linearity correction has been executed, for example, in two tracks adjacent in the radial direction. The RRO learning unit 620 determines that the variation REL1 in the linearity error is larger than the threshold values RE1 and RE2, and sets a linear learning position A, for example, px12 and px22 illustrated in FIG. 7.

After executing the linearity correction, the RRO learning unit 620 measures the variation REL2 in the linearity error in the radial region where the linearity correction has been executed. The RRO learning unit 620 determines that the variation REL2 in the linearity error is smaller than the threshold values RE1 and RE2, and sets a linear learning position B larger than the linear learning position A, for example, px11 and px21 illustrated in FIG. 7.

Figure 12:
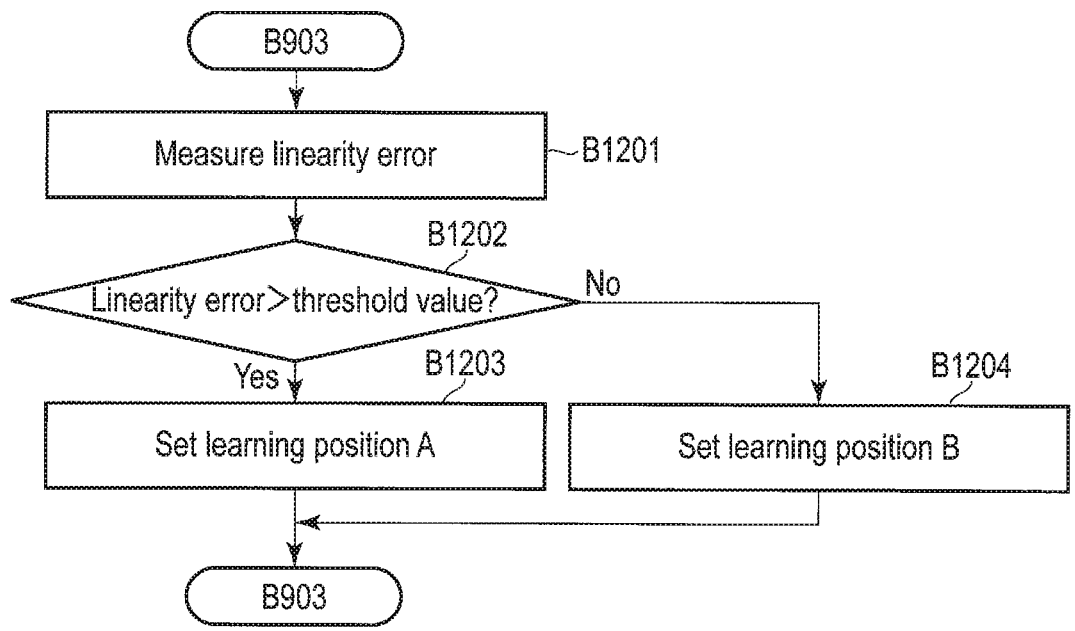
FIG. 12 is a flowchart illustrating an example of a method of setting a linear learning position according to a first modification.

FIG. 12 is a flowchart illustrating an example of a method of setting the linear learning position according to the first modification.

In the processing in B903 in FIG. 9, an MPU 60 measures the linearity error in the radial region where the linearity correction has been executed (B1201), and determines whether (the absolute value of) the linearity error is larger than (an absolute value of) a threshold value (B1202). When the MPU 60 determines that the linearity error is larger than the threshold value (YES in B1202), the MPU 60 sets the linear learning position A (B1203) and proceeds to the processing in B903. When the MPU 60 determines that the linearity error is smaller than the threshold value (NO in B1202), the MPU 60 sets the linear learning position B larger than the linear learning position A (B1204) and proceeds to the processing in B903.

According to the first modification, after executing the linearity correction in the radial region, the magnetic disk device 1 measures the linearity error in the radial region where the linearity correction has been executed, and sets the RRO learning position based on the measured linearity error. Therefore, the magnetic disk device 1 can improve servo positioning accuracy.

(Second Modification)

A magnetic disk device 1 of a second modification is different from the above-described embodiment and first modification in a method of setting a linear learning position.

After executing linearity correction in a radial region, an RRO learning unit 620 detects a variation periodic component in the radial region where the linearity correction has been executed, for example, in the radial region of a linearity error in two tracks adjacent in a radial direction, detects at least one variation periodic component having larger variation periodic amplitude than a threshold value (hereinafter referred to as an amplitude threshold value) of variation periodic amplitude of the variation periodic component, detects a variation periodic component having a shortest variation period (hereinafter referred to as a shortest periodic component) in the at least one variation periodic component having the variation periodic amplitude larger than the amplitude threshold value, and sets linear learning positions, for example, two linear learning positions, at an interval equal to or smaller than half of the variation period of the shortest periodic component. The variation period corresponds to, for example, a position in the radial direction. For example, the RRO learning unit 620 acquires the periodic component of the linearity error in two adjacent tracks as a fast Fourier transform (FFT) spectrum.

Figure 13:
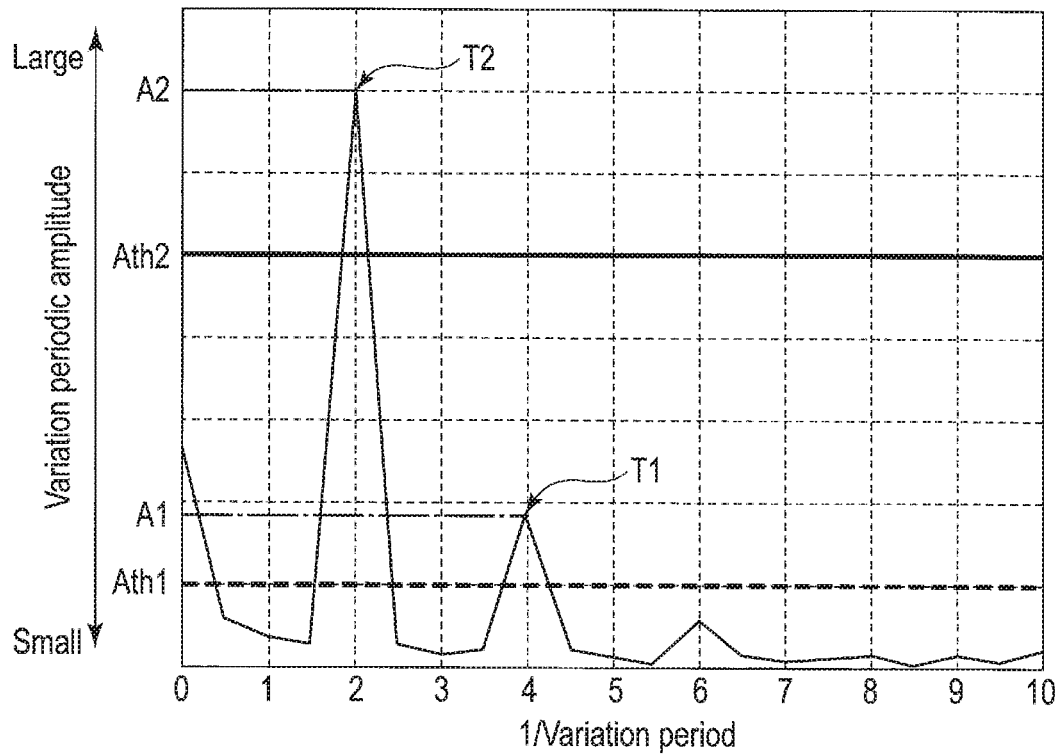
FIG. 13 is a diagram illustrating an example of a variation periodic component of a linearity error.

FIG. 13 is a diagram illustrating an example of the variation periodic component of the linearity error. In FIG. 13, the horizontal axis represents a reciprocal of the variation period of the linearity error of the radial region (hereinafter simply referred to as the variation period), and the vertical axis represents the variation periodic amplitude. The reciprocal of the variation period is a value obtained by dividing the servo track pitch by the variation period. Here, one servo track pitch corresponds to a distance in the radial direction between two adjacent tracks in the radial direction. The horizontal axis illustrates 1/the variation period=0, 1, 2, 3, 4, 5, 6, 7, 8, 9, and 10. On the vertical axis, the variation periodic amplitude becomes larger as the axis goes along the arrow of large, and the variation periodic amplitude becomes smaller as the axis goes along the arrow of small. FIG. 13 illustrates variation periodic amplitude A1 and A2 and amplitude threshold values Ath1 and Ath2. The variation periodic amplitude A1 is larger than the amplitude threshold value Ath1. The amplitude threshold value Ath2 is larger than the variation periodic amplitude A1 and the amplitude threshold value Ath1. The variation periodic amplitude A2 is larger than the variation periodic amplitude A1 and the amplitude threshold values Ath1 and Ath2. FIG. 13 illustrates a variation periodic component T1 of the variation periodic amplitude A1 at the reciprocal 4 (=0.25 servo track pitch) of the variation period, and a variation periodic component T2 of the variation periodic amplitude A2 at the reciprocal 2 (=0.5 servo track pitch) of the variation period.

In the example illustrated in FIG. 13, the RRO learning unit 620 detects the variation periodic component T1 and the variation periodic component T2, which are the variation periodic amplitude larger than the amplitude threshold value Ath1. The RRO learning unit 620 detects the variation periodic component T1 as the shortest periodic component from the variation periodic component T1 and the variation periodic component T2. The RRO learning unit 620 sets the linear learning position at an interval equal to or smaller than 0.125 servo track pitch that is equal to or less than half of the variation period 0.25 servo track pitch of the variation periodic component T1.

In the example illustrated in FIG. 13, the RRO learning unit 620 detects the variation periodic component T2 that is the variation periodic amplitude A2 larger than the amplitude threshold value Ath2. The RRO learning unit 620 detects the variation periodic component T2 as the shortest periodic component. The RRO learning unit 620 sets the linear learning position at an interval equal to or smaller than 0.25 servo track pitch that is equal to or less than half of the variation period 0.5 servo track pitch of the variation periodic component T2.

Figure 14:
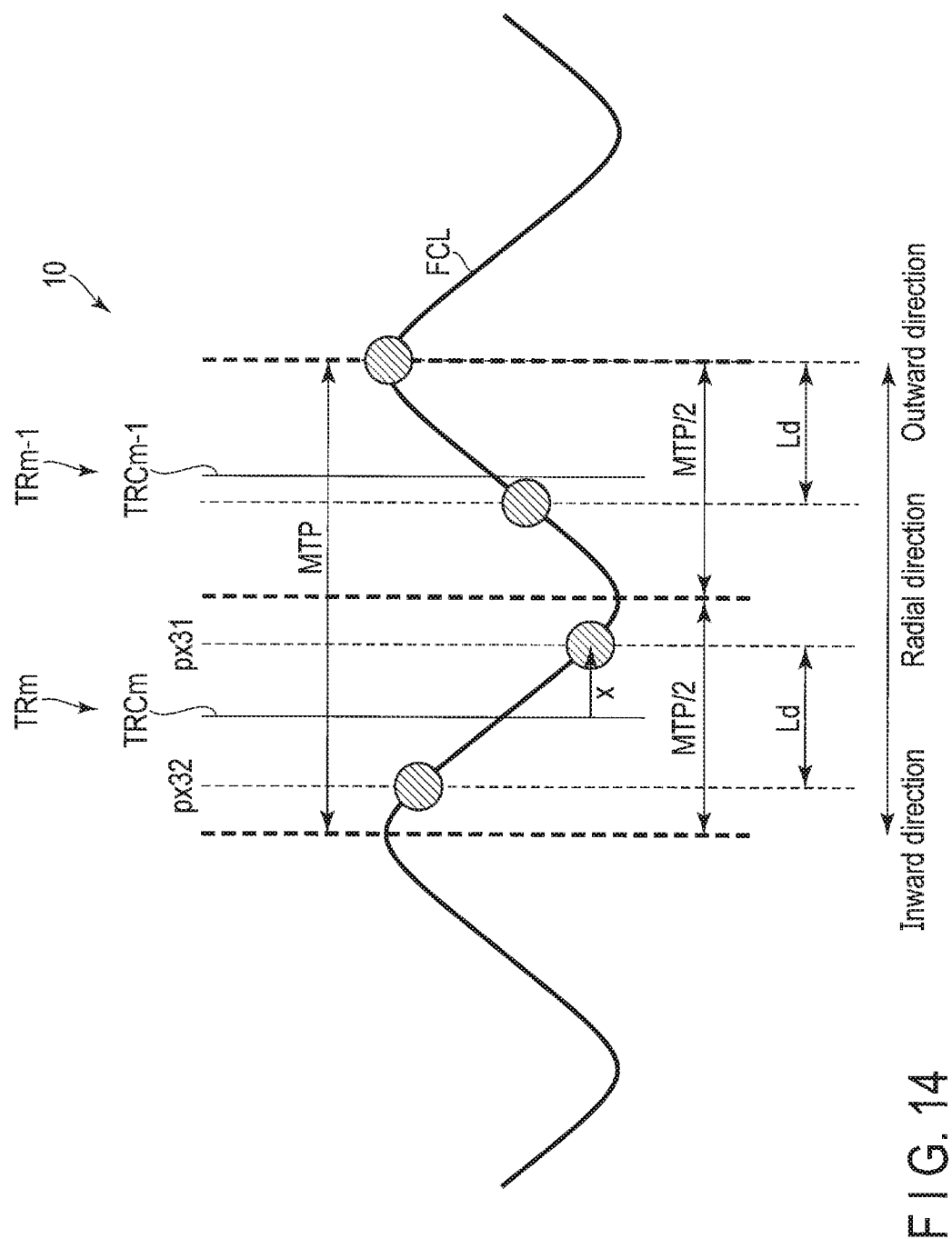
FIG. 14 is a schematic diagram illustrating an example of a method of setting a linear learning position according to a second modification.

FIG. 14 is a schematic diagram illustrating an example of a method of setting a linear learning position according to a second modification. In FIG. 14, the horizontal axis represents the radial direction. On the horizontal axis, a radial position is located on an outer periphery side of a disk 10 as the axis goes along the arrow of an outward direction, and the radial position is located on an inner periphery side of the disk 10 as the axis goes along the arrow of an inward direction. FIG. 14 illustrates two tracks TRm and TRm−1 adjacent in the radial direction. FIG. 14 illustrates a track center TRCm of the track TRm and a track center TRCm−1 of the track TRm−1. FIG. 14 illustrates a shortest periodic component FCL of a variation period MTP. In the shortest periodic component FCL, a round point indicates the set linear learning position. In FIG. 14, the two linear learning positions are set at an interval equal to or less than ½ of the variation period MTP. In FIG. 14, the two linear learning positions are separated in the radial direction at a linear learning position interval Ld. In other words, the linear learning position interval is the interval Ld. FIG. 14 illustrates two linear learning positions px31 and px32. The linear learning position px31 is separated by an off-track amount x in an outward direction with respect to the track center TRCm. The linear learning position px32 is separated in an inward direction with respect to the track center TRCm. The linear learning position px32 is separated from the linear learning position px31 by the interval Ld in the inward direction.

In the example illustrated in FIG. 14, the RRO learning unit 620 sets the two linear learning positions at an interval equal to or less than ½ (MTP/2) of the variation period MTP of the shortest periodic component FCL. For example, the RRO learning unit 620 sets the linear learning position px31 separated in the outward direction by the off-track amount x with respect to the track center TRCm of the track TRm at a particular interval equal to or less than the variation period MTP/2 around the track TRm. For example, the RRO learning unit 620 sets the radial position separated by an off-track amount Ld−x in the inward direction with respect to the track center TRCm calculated based on the off-track amount x from the track center TRCm of the track TRm at the linear learning position px31 and the linear learning position interval Ld, as the linear learning position px32, at a particular interval equal or less than the variation period MTP/2 around the track TRm.

Figure 15:
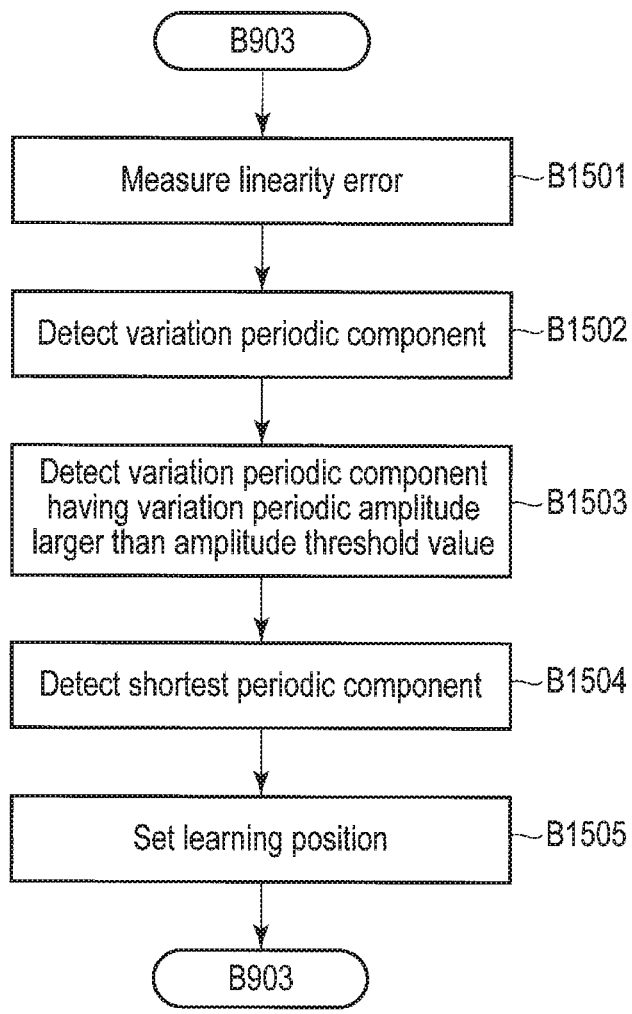
FIG. 15 is a flowchart illustrating an example of a method of setting a linear learning position based on linearity correction according to the second modification.

FIG. 15 is a flowchart illustrating an example of a method of setting a linear learning position based on linearity correction according to the second modification.

In the processing in B903 in FIG. 9, an MPU 60 measures the linearity error in the radial region where the linearity correction has been executed (B1501), detects the variation periodic component of the measured linearity error (B1502), and detects at least one variation periodic component having the variation periodic amplitude larger than the amplitude threshold value (B1503). The MPU 60 detects the shortest periodic component in the at least one variation periodic component having the variation periodic amplitude larger than the amplitude threshold value (B1504), sets the linear learning positions, for example, the two linear learning positions, at the interval equal to or less than half of the variation period of the shortest periodic component (B1505), and proceeds to the processing in B903.

According to the second modification, after executing the linearity correction in the radial region, the magnetic disk device 1 measures the linearity error in the radial region where the linearity correction has been executed, detects the variation periodic component of the measured linearity error, and detects at least one variation periodic component having the variation periodic amplitude larger than the amplitude threshold value. The magnetic disk device 1 detects the shortest periodic component in the at least one variation periodic component having the variation periodic amplitude larger than the amplitude threshold value, and sets the linear learning positions at the interval equal to or less than half of the variation period of the shortest periodic component. Therefore, the magnetic disk device 1 can improve servo positioning accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk including a recording region including a servo sector;
   a head configured to write data to the disk and read data from the disk; and
   a controller configured to acquire a plurality of correction data for a repeatable runout of the recording region, the correction data respectively corresponding to a plurality of measurement positions set based on a Lissajous waveform acquired by reading the servo sector, and to correct a position of the head based on the correction data.

2. The magnetic disk device according to claim 1, wherein the controller makes an interval of the measurement positions smaller as the Lissajous waveform approaches a quadrilateral shape.

3. A head position correction method applied to a magnetic disk device including a disk including a recording region including a servo sector and a head configured to write data to the disk and read data from the disk, the method comprising:
   acquiring a plurality of correction data for a repeatable runout of the recording region, the correction data respectively corresponding to a plurality of measurement positions set based on a first linearity error acquired by reading the servo sector;
   correcting a position of the head based on the correction data; and
   making an interval of the measurement positions smaller as the first linearity error becomes larger.

4. A head position correction method applied to a magnetic disk device including a disk including a recording region including a servo sector and a head configured to write data to the disk and read data from the disk, the method comprising:
   acquiring a plurality of correction data for a repeatable runout of the recording region, the correction data respectively corresponding to a plurality of measurement positions set based on a first linearity error acquired by reading the servo sector;
   correcting a position of the head based on the correction data;
   setting the measurement positions based on a parameter corresponding to the first linearity error acquired when reading the servo sector; and
   setting the measurement positions based on the parameter and a first expression indicating a relationship between the parameter and the measurement positions.

5. A head position correction method applied to a magnetic disk device including a disk including a recording region including a servo sector and a head configured to write data to the disk and read data from the disk, the method comprising:
   acquiring a plurality of correction data for a repeatable runout of the recording region, the correction data respectively corresponding to a plurality of measurement positions set based on a first linearity error acquired by reading the servo sector;
   correcting a position of the head based on the correction data;
   setting the measurement positions based on a second linearity error acquired by reading the servo sector after correcting the first linearity error;
   setting the measurement positions to a first measurement position in a case of determining that the second linearity error is larger than a first threshold value; and
   setting the measurement positions to a second measurement position larger than the first measurement position in a case of determining that the second linearity error is smaller than the first threshold value.

6. A head position correction method applied to a magnetic disk device including a disk including a recording region including a servo sector and a head configured to write data to the disk and read data from the disk, the method comprising:
   acquiring a plurality of correction data for a repeatable runout of the recording region, the correction data respectively corresponding to a plurality of measurement positions set based on a first linearity error acquired by reading the servo sector;
   correcting a position of the head based on the correction data;
   setting the measurement positions based on a second linearity error acquired by reading the servo sector after correcting the first linearity error; and
   setting the measurement positions based on a plurality of periodic components of the second linearity error.

7. The head position correction method according to claim 6, the method comprising:
   setting the measurement positions based on a first periodic component having amplitude larger than a first threshold value and having a shortest first period in the periodic components.

8. The head position correction method according to claim 7, the method comprising:
   setting the measurement positions for every second period equal to or less than half of the first period.

* * * * *